United States Patent
Chen et al.

(10) Patent No.: US 8,014,147 B2
(45) Date of Patent: Sep. 6, 2011

(54) FOLDABLE ELECTRONIC APPARATUS WITH AN ENHANCED PIVOTAL MECHANISM

(75) Inventors: Kuan-Ting Chen, Taipei (TW); Peter Timothy Clark, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 447 days.

(21) Appl. No.: 12/327,427

(22) Filed: Dec. 3, 2008

(65) Prior Publication Data

US 2009/0147469 A1    Jun. 11, 2009

Related U.S. Application Data

(60) Provisional application No. 61/012,064, filed on Dec. 7, 2007.

(51) Int. Cl.
*H05K 7/16* (2006.01)
(52) U.S. Cl. .............. 361/679.56; 200/61.62; 200/61.7; 361/679.27; 361/679.08; 361/679.09
(58) Field of Classification Search .................. 200/293, 200/61.62, 303, 61.7, 61.76, 61.82, 61.81; 361/679.01–679.3, 679.55, 679.56; 455/89, 455/90, 128, 351; 379/433, 434; 400/691, 400/680–682; 248/616, 188.8, 188.2, 677, 248/354.7
See application file for complete search history.

(56) References Cited

U.S. PATENT DOCUMENTS

| | | | | |
|---|---|---|---|---|
| 5,552,960 A | * | 9/1996 | Nelson et al. | 361/679.54 |
| 5,646,872 A | * | 7/1997 | Yonenaga et al. | 708/173 |
| 6,053,589 A | * | 4/2000 | Lin | 312/271 |
| 6,175,492 B1 | * | 1/2001 | Nobuchi | 361/679.08 |
| 6,373,006 B1 | * | 4/2002 | Toki | 200/61.7 |
| 6,459,573 B1 | * | 10/2002 | DiStefano et al. | 361/679.46 |
| 6,525,750 B1 | * | 2/2003 | Knox | 345/30 |
| 6,853,543 B1 | * | 2/2005 | Moore et al. | 361/679.12 |
| 6,961,240 B2 | * | 11/2005 | Janicek | 361/679.46 |
| 7,200,000 B1 | * | 4/2007 | Huang | 361/679.55 |

FOREIGN PATENT DOCUMENTS

| TW | 365412 | 7/1999 |
|---|---|---|
| TW | 506246 | 10/2002 |

* cited by examiner

*Primary Examiner* — Michael A Friedhofer
(74) *Attorney, Agent, or Firm* — Muncy, Geissler, Olds & Lowe, PLLC

(57) ABSTRACT

A portable electronic apparatus includes a first casing, a second casing, and an enhanced pivotal mechanism for folding/unfolding the second casing with respect to the first casing. The pivotal mechanism further includes a main pivot to pivot the first casing and the second casing; a combination constructed on the first casing and further including a first driving element driven by the main pivot, a first cam driven by the first driving element, and a first cover pivotally rotated by the first cam; and, another combination constructed on the second casing and further including a second driving element driven by the main pivot, a second cam driven by the second driving element, and a second cover pivotally rotated by the second cam.

14 Claims, 4 Drawing Sheets

FOLDABLE ELECTRONIC APPARATUS WITH AN ENHANCED PIVOTAL MECHANISM

CROSS REFERENCE TO RELATED APPLICATIONS

This application claims priority of Provisional Application No. 61/012,064 filed on Dec. 7, 2007 under 35 U.S.C. §119; the entire contents of all of which are hereby incorporated by reference.

BACKGROUND OF THE INVENTION (1) Field of the Invention

The invention relates to a foldable electronic apparatus, and more particularly to a foldable portable electronic apparatus that has a multi-purpose pivotal mechanism.

(2) Description of the Prior Art

A foldable formation is usually seen in a portable electronic apparatus, such as a notebook computer, a mobile phone, a personal digital assistant, and so on. The notebook, for example, includes a first casing (the computer portion) and a second casing (the display portion) pivoted to the first casing along adjacent pairing sides to achieve the foldable formation.

In an unfolded state of a typical notebook computer, the computer portion is usually to be rested on a flat surface, while the display portion is pivotal to an appropriate oblique pose for easing user's eyesight. A keypad is set with an almost flush style to top the computer portion. From such a keypad design, a user might meet wrist or forearm discomfort in operating the keypad. To ease the discomfort from typing the horizontal-posed keypad, the computer portion is usually lifted up slightly at the pivotal side that extending the display portion, such that better typing scenery resembling to a traditional typewriter can be obtained.

In addition, to meet the prosperity in game software industry, it is a trend to introduce a specialist notebook computer for video games. Also, to mimic a gaming environment, it is usually hoped that the specialist computer game for video games can produce some magnificently brilliant video and audio entertainment effects resembling to, for example, those seen in a traditional play station.

Accordingly, to meet the aforesaid typing and entertainment requirements, this invention is to present an electronic device, particularly the notebook computer, that can provide its user both typing comfort and sufficient entertainment simultaneously and automatically.

SUMMARY OF THE INVENTION

It is an object of the present invention to provide a portable electronic apparatus with an enhanced pivotal mechanism. The portable electronic apparatus mainly includes a first casing, a second casing, and a pivotal mechanism for folding/unfolding the second casing with respect to the first casing. The pivotal mechanism further includes a main pivot, a first cover, a first cam, a first driving element, a second cover, a second cam, and a second driving element.

The first cover is pivotal to the first casing through a first pivot shaft. The first cam to drive the first cover is located inside the first casing in a relevant place adjacent the first cover. The first driving element has a first end to connect pivotally with the main pivot and to be driven thereby, and a second end to connect pivotally with the first cam as a driving element to rotate the first cam.

The second cover is pivotal to the second casing through a second pivot shaft. The second cam to drive the second cover is located inside the second casing in a relevant place adjacent the second cover. The second driving element has a third end to connect pivotally with the main pivot and to be driven thereby, and a fourth end to connect pivotally with the second cam as a driving element to rotate the second cam.

In the present invention, in the case that the second casing is pivotally unfolded from the first casing through rotating about the main pivot (an unfolded state between the first casing and the second casing), the first cam is also rotated along with the main pivot through the first driving element so as to push and unfold the first cover from the first casing through rotating about the first pivot shaft.

Similarly, at the same time that the second casing is pivotally unfolded from the first casing through rotating about the main pivot, the second cam is also rotated along with the main pivot through the second driving element so as to push and unfold the second cover from the second casing through rotating about the second pivot shaft.

On the other hand, in the case that the first casing and the second casing are in a folded state, the second casing is to fold on top of the first casing through the main pivot, the first cover is to fold into the first casing, and the second cover is to fold into the second casing.

By providing the enhanced pivotal mechanism of the present invention to the foldable electronic apparatus, rotation of the main pivot can be further used, though the respective linking bars and cams, to wing-spread automatically the first cover and the second cover from the first casing and the second casing, respectively. Upon such an arrangement, the unfolding of the first cover can be used to stand obliquely the first casing, and the unfolding of the second cover can be used to form a space for generating some audio and video entertainment effects behind the second casing.

All these objects are achieved by the foldable electronic apparatus with an enhanced pivotal mechanism described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a foldable electronic apparatus with an enhanced pivotal mechanism. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
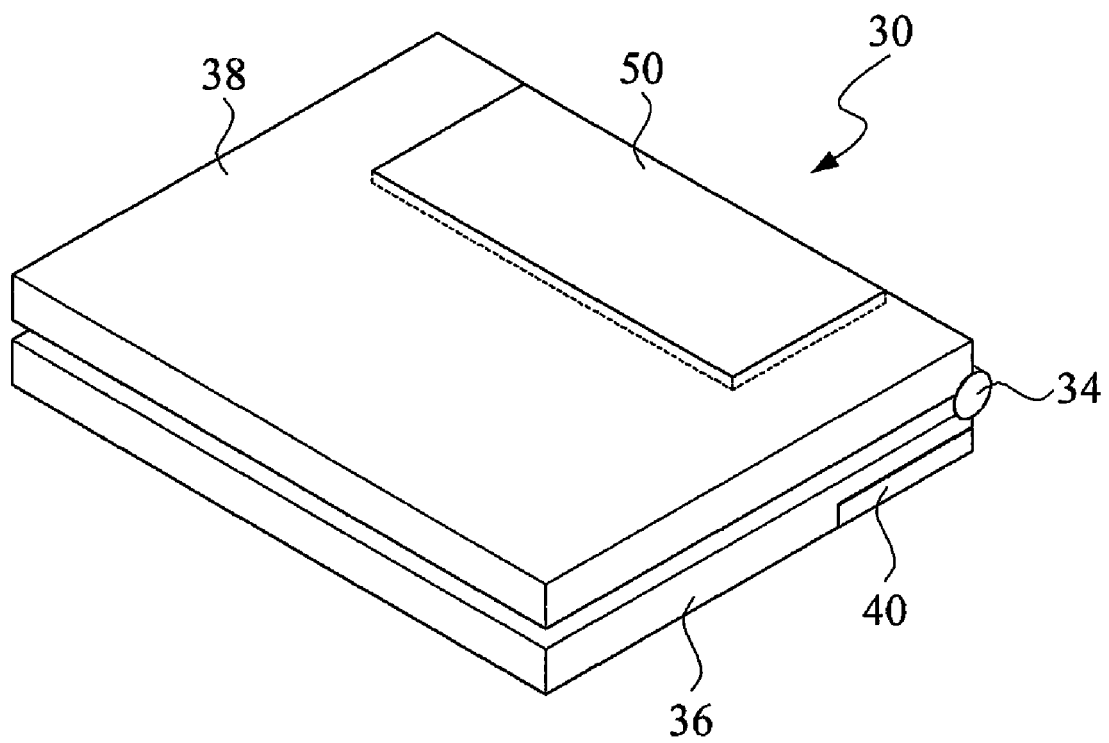
FIG. 1 is a schematic perspective view of a preferred foldable electronic apparatus with an enhanced pivotal mechanism in accordance with the present invention, shown in a folded state.
Figure 2:
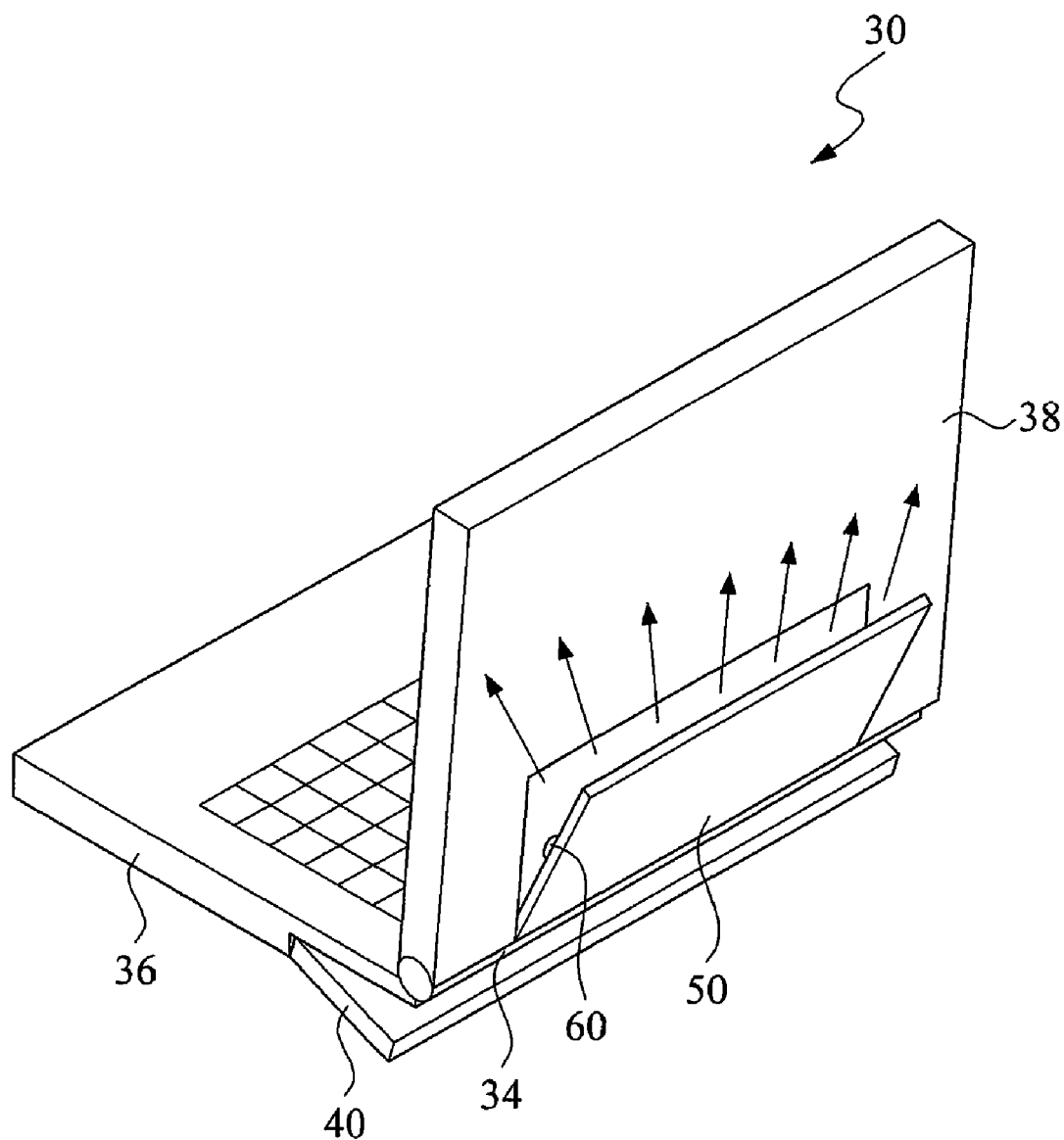
FIG. 2 is the foldable electronic apparatus of FIG. 1 in an unfolded state.

Referring now to FIG. 1 and FIG. 2, a folded sate and an unfolded sate of a preferred foldable electronic apparatus with an enhanced pivotal mechanism are perspective shown, respectively. It is noted that an example of a typical notebook computer is herein embodied as the foldable electronic apparatus 30 of the present invention.

As shown, the foldable electronic apparatus 30 includes an enhanced pivotal mechanism 32 to fold/unfold a first casing 36 and the second casing 38, strictly about the main pivot 34 of the enhanced pivotal mechanism 32. By taking the notebook computer as the embodiment, the first casing 36 is the computer portion having the keypad, the hard disc, the mother board, and so on, while, on the other hand, the second casing 38 is the display portion having an LCD screen.

In the case that the second casing 38 is folded on top of the first casing 36 as the folded state shown in FIG. 1, a first cover 40 and a second cover 50 of the apparatus 30 can be nested adjacent the main pivotal shaft 34 in a flush manner to the first casing 36 and the second casing 38, respectively. While the second casing 38 is unfolded away from the first casing 36 through rotating about the main pivot 34 to the unfolded state as shown in FIG. 2, the first cover 40 and the second cover 50 can be further unfolded from the first casing 36 and the second casing 38, respectively.

In the case that the first cover 40 and the second cover 50 are in their own unfolded states as shown in FIG. 2, the first cover 40 can stand or lift the first casing 36 at a rear portion thereof by a substantial height such that a better typing angle can be provided to the user of the apparatus 30, and the unfolded second cover 50 would expose specific light sources 60 built in between the second casing 38 and the second cover 50 such that, by illuminating the light sources 60, a better video effect behind the second casing 38 can be produced.

Figure 3:
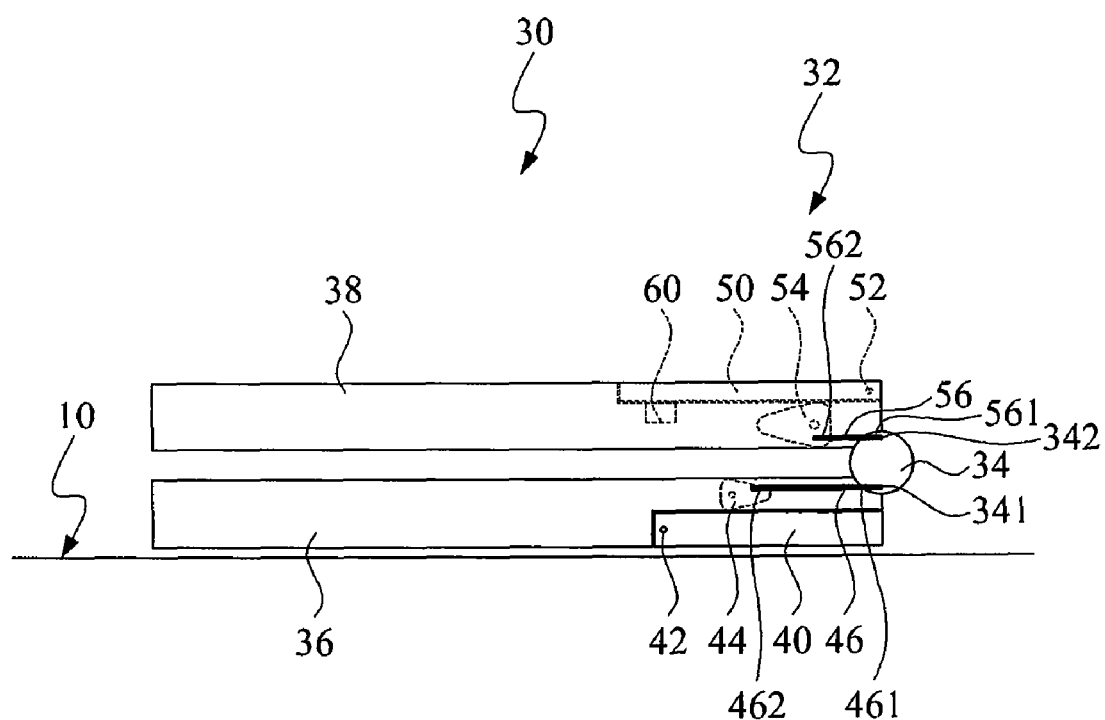
FIG. 3 is a schematic lateral view of FIG. 1, showing a preferred combination of the enhanced pivotal mechanism in the folded state.
Figure 4:
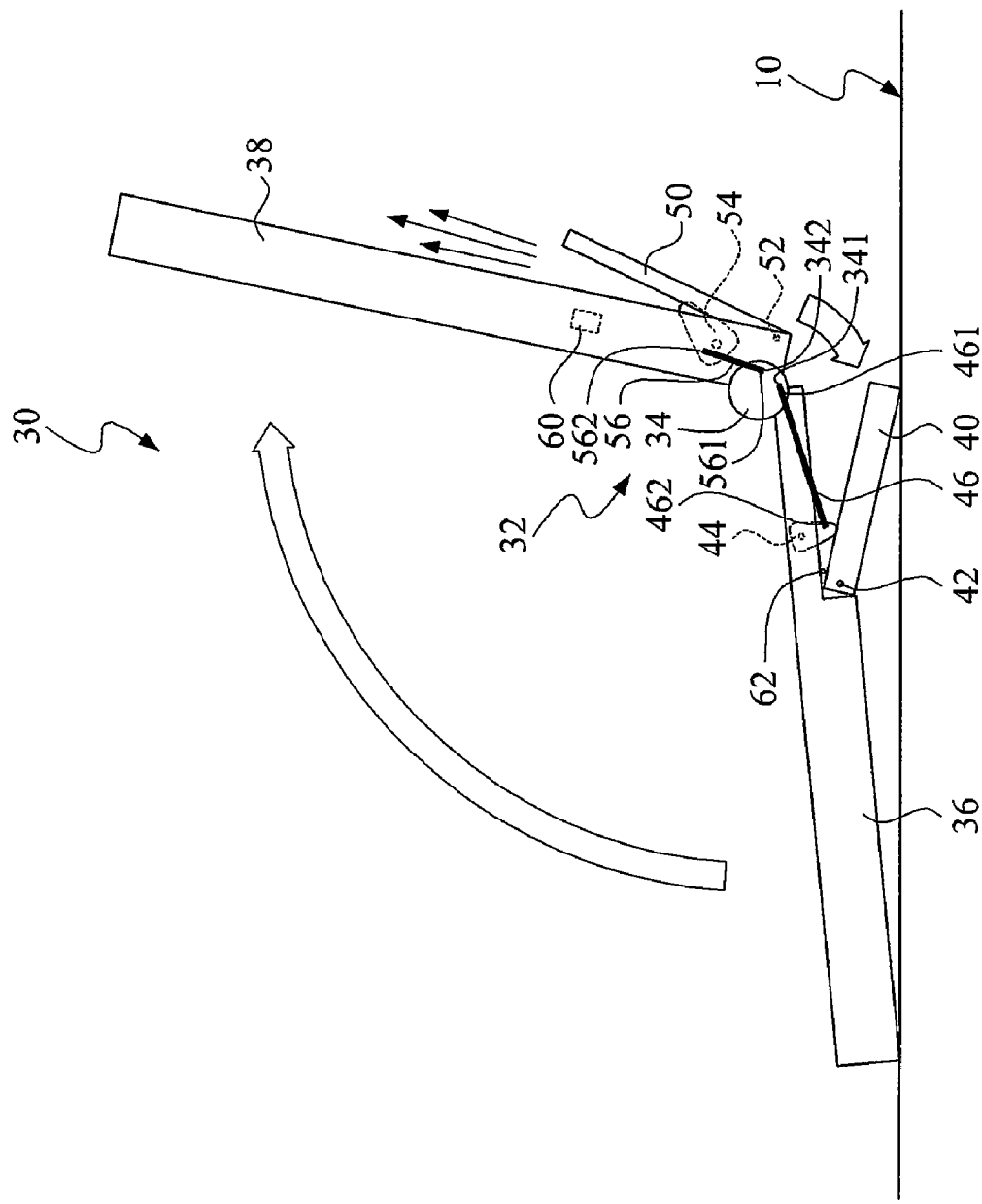
FIG. 4 is a schematic lateral view of FIG. 2, showing particularly the enhanced pivotal mechanism in the unfolded state.

Referring now to FIG. 3 and FIG. 4, schematic lateral views respectively upon the folded state and the unfolded state of the apparatus 30 in FIG. 1 or FIG. 2 are shown to elucidate a preferred composition of the enhanced pivotal mechanism 32 for the apparatus 30.

As shown, the enhanced pivotal mechanism 32 of the present invention includes the main pivot 34, a first driving element 46, a first cam 44, a first pivot shaft 42, the first cover 40, a second driving element 56, a second cam 54, a second pivot shaft 52, and the second cover 50. By pivoting to the main pivot 34, the first casing 36 and the second casing 38 can fold/unfold with each other as an openable two-page structure.

The first cover 40 is pivotal to the first casing 36 through a first pivot shaft 42 located at a middle place of the first casing 36. The first cam 44 to drive the first cover 40 is located inside the first casing 36 in a relevant place adjacent the first cover 40 so as to push the first cover 40 all the way in motion with the rotation of the main pivot 34. The first driving element 46 has a first end 461 (please add to FIG. 3 and FIG. 4) to connect pivotally to a first peripheral point 341 (please add to FIG. 3 and FIG. 4) on the main pivot 34 and to be driven thereby in an offset manner, and a second end 462 (please add to FIG. 3 and FIG. 4) to connect pivotally with the first cam 44 as a driving element to rotate the first cam 44 in an offset manner. Actually, the combination of the main pivot 34, the first driving element 46 and the first cam 44 forms a four-bar linkage extended inside the first casing 36 for driving the first cover 40, with the main pivot 34 as the driving element and the first cam 44 as the driven element.

The second cover 50 is pivotal to the second casing 38 through a second pivot shaft 52 located at an end portion of the second casing 38 adjacent the main pivot 34. The second cam 54 to drive the second cover 50 is located inside the second casing 38 in a relevant place adjacent the second cover 50 so as to push the second cover 50 all the way in motion with the rotation of the main pivot 34. The second driving element 56 has a third end 561 (please add to FIG. 3 and FIG. 4) to connect pivotally with a second peripheral point 342 (please add to FIG. 3 and FIG. 4) on the main pivot 34 and to be driven thereby in an offset manner, and a fourth end 562 (please add to FIG. 3 and FIG. 4) to connect pivotally with the second cam 54 as a driving element to rotate the second cam 44 in an offset manner. Actually, the combination of the main pivot 34, the second driving element 56 and the second cam 54 forms another four-bar linkage extended inside the second casing 38 for driving the second cover 50, with the main pivot 34 as the driving element and the second cam 54 as the driven element.

As shown in FIG. 3 and FIG. 4, in the present pivotal mechanism 32, the construction of the first driving element 46 and the second driving element 56 is carefully arranged to offset the rotation centers of the main pivot 34, the first cam 44 and the second cam 54. Upon such an arrangement, the rotation of the main pivot 34 can be relevantly adopted to drive the first cam 44 and the second came 54.

As shown in FIG. 4, in the case that the second casing 38 is pivotally unfolded from the first casing 36 through rotating about the main pivot 34 so as to obtain the unfolded state in between, the first cam 44 can also rotate, actually driven by the main pivot 34 through the first driving element 46, to push and unfold or wing-spread the first cover 40 away from the first casing 36 through rotating about the first pivot shaft 42. As illustrated, the wing-spreading of the first cover 40 can perform as a stand of the rear portion (adjacent the second casing 38) of the first casing 36 on the surface 10 that rests the apparatus 30. Upon such an arrangement, the first casing 36 can pose an oblique state so as to further prepare the user a better typing keypad (not shown in the figures) on the first casing 36.

Referred also to FIG. 4, while in the unfolded state of the apparatus 30, the second cam 54 is rotated, actually driven by the main pivot 34 through the second driving element 56, to push and unfold or wing-spread the second cover 50 away from the second casing 38 through rotating about the second pivot shaft 52.

While, from the aforesaid description, FIG. 4 can be understood how the unfolded state of the apparatus 30 can be obtained from FIG. 3 by rotating the main pivot 34, it is self-explained how the folded state of the apparatus in FIG. 3 can be achieved by counter-rotating the main pivot 34 in FIG. 4. Namely, it is obvious that the folded state of the apparatus to have the second casing 38 folded upon the first casing 36 so as to nest the first cover 40 into the first casing 36 can be simply achieved by corresponding rotation from the main pivot 34 though the first driving element 46 and the first cam 44. Also, in the folded state, the second cover 50 can be retrieved into the second casing 38 by rotating the main pivot 34 and the following co-motion of the second linkage bar 56 and the second cam 54.

It is well known in the art to an ordinary cam-follower mechanism, like the combination of the first cam 44 and the first cover 40 or that of the second cam 54 and the second cover 50, that a spring element shall be included to provide resilience for ensuring all-time contact between the cam surface and the follower, i.e. the first cover or the second cover. The spring element can be a torsion spring at the pivot shaft, a tension spring connecting the follower and a fix structure mounting the cam, or any the like.

In the present invention, for the maturity in contour design of the cam structure, the configurations for the first cam 44 and the second cam 54 are not elucidated herein. However, to a skill person in the art, the formation of the cams would be obvious after he/she understands the teaching of foregoing description of the present invention.

In the present invention, though not clearly seen from FIG. 1 through FIG. 4, special considerations in manufacturing rotational parts, rotational edges, corners to knee the rotational parts, and so on shall be still carefully noticed, such that possible interference won't happen to the rotation parts of the present invention. However, those interference amendments in structuring the apparatus are well known to the art and thus omitted herein.

Although, in the preferred embodiment of the present invention described above, the first cover 40 performs as a stand of the first casing 36 and the second cover 50 is used to expose the video elements (light sources) 60 built in the second casing 38, yet the application of these two driven elements 40 and 50 shall not be limited to the aforesaid embodiment. In other application not shown here but well understood from the aforesaid description, the video elements 60 can also be built in the space between the first casing 36 and the first cover 40, such that additional video effects can be obtained in the unfolded state of the first cover 40.

Further, to control any of the video elements 60, an ON/OFF switch 62, preferably a touch switch, shall be included. The ON/OFF switch 62 can be constructed adjacent to the driven element 40 (as shown in FIG. 4) or 50, the main pivot 34, the linking bar 46 or 56, the cam shaft 44 or 54, or any other place that can be touched or untouched along with the folding motion of the apparatus 30.

By providing the aforesaid enhanced pivotal mechanism 32 to the foldable electronic apparatus 30 in accordance with the present invention, folding rotation of the main pivot 34 can be successfully utilized, through the linking bar-cam-follower (driven element) pairs, to wing-spread automatically the first cover 40 and the second cover 50 from the first casing 36 and the second casing 38, respectively. Preferably, the unfolding of the first cover 40 can be used to stand obliquely the first casing 36, and the unfolding of the second cover 50 can initiate some audio and video entertainment effects behind the second casing 38.

In the aforesaid embodiment, the first cover 40 as a retrievable stand to the first casing 36 is embodied as a broad pivotal plate. Yet, in other application, the first cover 40 can also be embodied as a pair of pivotal stands, take-off gears, or any other structure able to perform the similar function of the first cover 40 described above.

Similarly, in the aforesaid embodiment, the second cover 50 as a door to expose the light sources/video elements 60 at the second casing 38 is embodied as a broad pivotal plate. Yet, in other application, the second cover 50 can also be embodied as a fork structure to just cover the video elements 60, isolated plates to individually each of the video elements 60, or any other structure able to perform the similar function of the second cover 50 described above.

Further, in the aforesaid embodiment, the foldable electronic apparatus 30 is embodied as a notebook computer. Yet, in other application, the foldable electronic apparatus 30 can also be embodied as a foldable mobile phone, a foldable PDA, or any other foldable electronic device.

While the present invention has been particularly shown and described with reference to a preferred embodiment, it will be understood by those skilled in the art that various changes in form and detail may be without departing from the spirit and scope of the present invention.

We claim:

1. A foldable electronic apparatus, comprising:
    a first casing;
    a second casing;
    a main pivot, pivotally connected to the first casing and the second casing;
    a first cover, pivotally connected to the first casing;
    a first cam, pivotally connected to the first casing in a place between the first casing and the first cover; and
    a first driving element, connected to the main pivot and the first cam;
    wherein, when the first casing is unfolded from the second casing through the main pivot, the main pivot rotates to drive the first driving element to rotate the first cam, and then the first cover is unfolded from the first casing.

2. The foldable electronic apparatus according to claim 1, further including a folded state of the second casing folding upon the first casing, in which the first cover is nested in the first casing by corresponding rotation from the main pivot though the first driving element and the first cam.

3. The foldable electronic apparatus according to claim 1, further including:
    a second cover, pivotally connected to the second casing;
    a second cam, pivotally connected to the second casing in a place between the second casing and the second cover; and
    a second driving element, connected to the main pivot and the second cam;
    wherein, when the first casing is unfolded from the second casing through the main pivot, the main pivot rotates to drive the second driving element to rotate the second cam, and then the second cover is unfolded from the second casing.

4. The foldable electronic apparatus according to claim 3, further including a folded state of the second casing folding upon the first casing, in which the second cover is retrieved into the second casing by corresponding rotation from the main pivot though the second driving element and the second cam.

5. The foldable electronic apparatus according to claim 3, further including a light source between the second casing and the second cover, and when the second cover is unfolded from the second casing, a light switch is driven to turn on the light source.

6. The foldable electronic apparatus according to claim 1, further including a surface for resting the first casing and the first cover, the first casing being posed in an oblique state on the surface while the first cover is pivoted away from the first casing.

7. The foldable electronic apparatus according to claim 1, wherein the first driving element further has a first end to connect pivotally to a first peripheral point on the main pivot and so as to be driven thereby in an offset manner, and a second end to connect pivotally with the first cam as a driving element to rotate the first cam in another offset manner.

8. An enhanced pivotal mechanism to pivot a first casing with respect to a second casing of a foldable electronic apparatus, comprising:
    a main pivot, pivotally connected to the first casing and the second casing;
    a first cover, pivotally connected to the first casing;
    a first cam, pivotally connected to the first casing in a place between the first casing and the first cover; and
    a first driving element, connected to the main pivot and the first cam;
    wherein, when the first casing is unfolded from the second casing through the main pivot, the main pivot rotates to drive the first driving element to rotate the first cam, and then the first cover is unfolded from the first casing.

9. The enhanced pivotal mechanism according to claim 8, further including a folded state of the second casing folding upon the first casing, in which the first cover is nested in the first casing by corresponding rotation from the main pivot though the first driving element and the first cam.

10. The enhanced pivotal mechanism according to claim 8, further including:
- a second cover, pivotally connected to the second casing;
- a second cam, pivotally connected to the second casing in a place between the second casing and the second cover; and
- a second driving element, connected to the main pivot and the first cam;
- wherein, when the first casing is unfolded from the second casing through the main pivot, the main pivot rotates to drive the second driving element to rotate the second cam, and then the second cover is unfolded from the second casing.

11. The enhanced pivotal mechanism according to claim 10, further including a folded state of the second casing folding upon the first casing, in which the second cover is retrieved into the second casing by corresponding rotation from the main pivot though the second driving element and the second cam.

12. The enhanced pivotal mechanism according to claim 10, further including a light source between the second casing and the second cover, and when the second cover is unfolded from the second casing, a light switch is driven to turn on the light source.

13. The enhanced pivotal mechanism according to claim 10, further including a surface for resting the first casing and the first cover, the first casing being posed in an oblique state on the surface while the first cover is pivoted away from the first casing.

14. The enhanced pivotal mechanism according to claim 8, wherein the first driving element further has a first end to connect pivotally to a first peripheral point on the main pivot and so as to be driven thereby in an offset manner, and a second end to connect pivotally with the first cam as a driving element to rotate the first cam in another offset manner.

* * * * *